(12) United States Patent
Natkiel

(10) Patent No.: US 10,602,684 B2
(45) Date of Patent: Mar. 31, 2020

(54) WATER LEVEL ADJUSTER FOR A PLANT WATERING DEVICE

(71) Applicant: Hanover Design Group—HDG, LLC, Hanover, NH (US)

(72) Inventor: Paul Natkiel, Hanover, NH (US)

(73) Assignee: Hanover Design Group—HDG, LLC, Hanover, NH (US)

( * ) Notice: Subject to any disclaimer, the term of this patent is extended or adjusted under 35 U.S.C. 154(b) by 54 days.

(21) Appl. No.: 16/258,782

(22) Filed: Jan. 28, 2019

(65) Prior Publication Data

US 2019/0246583 A1 Aug. 15, 2019

Related U.S. Application Data

(60) Provisional application No. 62/630,309, filed on Feb. 14, 2018.

(51) Int. Cl.
*A01G 27/00* (2006.01)
*D06F 39/08* (2006.01)

(52) U.S. Cl.
CPC ......... *A01G 27/006* (2013.01); *A01G 27/005* (2013.01); *A01G 27/008* (2013.01); *D06F 39/087* (2013.01)

(58) Field of Classification Search
CPC ...... A01G 27/008; A01G 27/00; A01G 25/00; A01G 2025/006; A01G 25/16; A01G 25/06; A01G 29/00; A01G 27/005; A01G 27/006; A01G 31/02; A01M 1/026; A01M 1/2005; A01M 1/2011; D06F 39/087
See application file for complete search history.

(56) References Cited

U.S. PATENT DOCUMENTS

| | | | | |
|---|---|---|---|---|
| 419,242 A * | 1/1890 | Brown | ................... | A01G 29/00 47/48.5 |
| 1,650,081 A * | 11/1927 | Lindsey | ................. | A01B 79/00 111/7.1 |
| 3,757,469 A * | 9/1973 | Smith | .................... | A01G 29/00 111/7.1 |
| 3,821,863 A * | 7/1974 | Chan | ..................... | A01C 21/00 47/48.5 |
| 4,866,880 A | 9/1989 | Weinblatt | | |
| 4,870,781 A * | 10/1989 | Jones | ..................... | A01G 29/00 47/43 |
| 5,129,758 A * | 7/1992 | Lindstrom | ............. | A01G 25/06 138/103 |

(Continued)

FOREIGN PATENT DOCUMENTS

FR 2556929 A1 * 6/1985 ............. A01G 29/00

*Primary Examiner* — Kathleen I Alker
(74) *Attorney, Agent, or Firm* — Clayton R. Morlock

(57) ABSTRACT

An apparatus and method to regulate the fluid level in a plant watering device is described. In an embodiment, the plant watering device comprises a fluid reservoir that is supported by an adapter/fluid regulator that sits within a hollow permeable plant stake. The plant stake is designed to be pressed into soil adjacent to a plant growing in the soil. The adapter sits within the plant stake and acts as a valve with multiple settings that control the depth of water in the plant stake. Exposing the permeable plant stake to various levels of water affects the rate of permeation through the stake and thereby regulates the watering rate for the plant.

6 Claims, 9 Drawing Sheets

(56) References Cited

U.S. PATENT DOCUMENTS

| | | | | |
|---|---|---|---|---|
| 5,276,997 A * | 1/1994 | Swearengin | ........... | A01G 9/022 47/48.5 |
| 5,901,496 A * | 5/1999 | Woodruff | .............. | A01M 1/026 43/124 |
| 6,065,241 A * | 5/2000 | Woodruff | .............. | A01M 1/026 239/59 |
| 6,243,986 B1 | 6/2001 | Crowley | | |
| 6,598,338 B2 * | 7/2003 | Buss | .................... | A01G 27/006 47/48.5 |
| 6,631,583 B2 * | 10/2003 | Rollins | ................. | A01M 1/026 43/124 |
| 6,964,124 B2 * | 11/2005 | Brode, III | ............. | A01M 1/026 43/131 |
| 7,128,278 B2 * | 10/2006 | Archambeau | .......... | A01G 25/00 239/8 |
| 7,225,585 B2 * | 6/2007 | Zayeratabat | ........... | A01G 9/122 47/47 |
| 2016/0338274 A1 * | 11/2016 | Messner | ................ | A01G 25/16 |
| 2018/0035621 A1 * | 2/2018 | Allen | ..................... | A01G 25/06 |

* cited by examiner

WATER LEVEL ADJUSTER FOR A PLANT WATERING DEVICE

CROSS REFERENCE TO RELATED APPLICATIONS

Not applicable

BACKGROUND OF THE INVENTION

Field of Use

This invention pertains to automated plant watering devices. Other fluids or water with dissolved nutrients or minerals can also be dispensed and these fluids are collectively referred to as water in this document.

Description of the Related Art

Plant watering devices are well known in the art. An example of a watering device is a hollow and permeable terracotta stake. A wine bottle or other necked container is filled with water and is inverted in the stake. The stake is pressed into soil adjacent to a growing plant. The water level within the stake will be maintained at the level within the stake at an elevation slightly above the mouth of the wine bottle. There is no way for air to displace the water in the bottle since the mouth of the bottle is covered by water. When the water level goes down in the stake, air can move into the bottle and water can flow out into the stake from the bottle. As fluid permeates through the stake, water from the reservoir replaces the permeated water.

OBJECT OF THE INVENTION

It is the object of this invention to provide a means to adjust the fluid level within a plant watering device (for example a plant watering stake) that is gravity fed water from a closed reservoir. The water level within a permeable stake will affect the diffusion rate of water into soil and adjusting this water level will change how fast water enters the soil adjacent to the plant watering device.

SUMMARY OF THE INVENTION

Embodiments of this invention are applicable to plant watering devices that comprise a water dispenser made of a hollow cylindrical vessel that is closed on a bottom end and open on the top end. The vessel is made of a water permeable material or has a portion of the vessel that is water permeable. An example of this vessel is a terracotta stake. The water dispenser is designed to be pressed into soil adjacent to a plant where water contained in the dispenser can diffuse through the permeable material into the soil, thus watering the plant. The water level in the dispenser will affect how quickly water will diffuse through the permeable material. Typically a water reservoir sits atop the dispenser and provides water to the dispenser via a gravity feed as water is diffused into the soil. The water reservoir is a closed container with an opening or openings within the dispenser's annulus. Since the reservoir is closed, water can only flow out of the reservoir if there is a supply of air to displace the water in the reservoir. Therefore water will only flow into the dispenser until an upper most opening attached to the reservoir is covered with water (prohibiting the flow of air into the reservoir).

Embodiments of this invention are a means to control the level of water within the dispenser. In certain applications, it is desirable to have the water level in a plant watering device be adjustable. In an example where the water dispenser for a watering device is a terracotta plant stake, if the water level within the stake is lower or higher, the change will affect the rate at which the water can diffuse through the stake and consequently vary the rate of water entering the soil. Adjustability makes it possible to water plants that require different amounts of water and to use the same device for multiple types of plants.

According to one aspect of the invention, a water level adjuster for a plant watering device comprises a hollow, substantially cylindrical valve body that is designed to fit concentrically within a water dispenser. At the top end of the valve body is a substantially watertight connector for a water reservoir which allows water to flow into the valve body. There is a flange also on the top of the valve body that supports the reservoir and positions the water level adjuster on the water dispenser. The substantially cylindrical portion of the valve body is concentrically covered by a sleeve that also has perforations (the same number and size as the valve body). The sleeve is configured to rotate or slide relative to the valve body in order to allow one set of perforations to line up between the sleeve and the valve body. The sleeve forms a substantially water tight seal over the perforations in the valve body (when the perforations are not aligned). The seal may be assisted by a gasket placed between the valve body and the sleeve.

When a perforation is aligned between the sleeve and the valve body, a fluid (liquid or air) connection is established between the water reservoir and the annular space of the water dispenser. When water is present in the water reservoir and the reservoir is in a position for gravity to cause the water to flow into the adjuster/dispenser, then the level of the fluid within the dispenser will be at the height slightly above the top most perforations that are aligned. If no perforations align, then the level of the fluid in the dispenser will be slightly above the level of the base of the valve body or at the base of the sleeve, if the sleeve extends below valve body.

The water level adjuster is typically made of injection molded plastic, or resin, for example, nylon, hdpe, and ldpe. Various forms of 3-D printing could also be used to fabricate the water level adjuster. In some embodiments, the sleeve that is part of the water level adjuster is made from a more elastic plastic than the valve body—to better effect a near water tight seal.

BRIEF DESCRIPTION OF THE DRAWINGS

Embodiments of the invention will now be described by way of examples with reference to drawings.

FIG. 1D is a section view of a planter watering device

DETAILED DESCRIPTION OF THE INVENTION

Figures 1A, 1B, 1C:
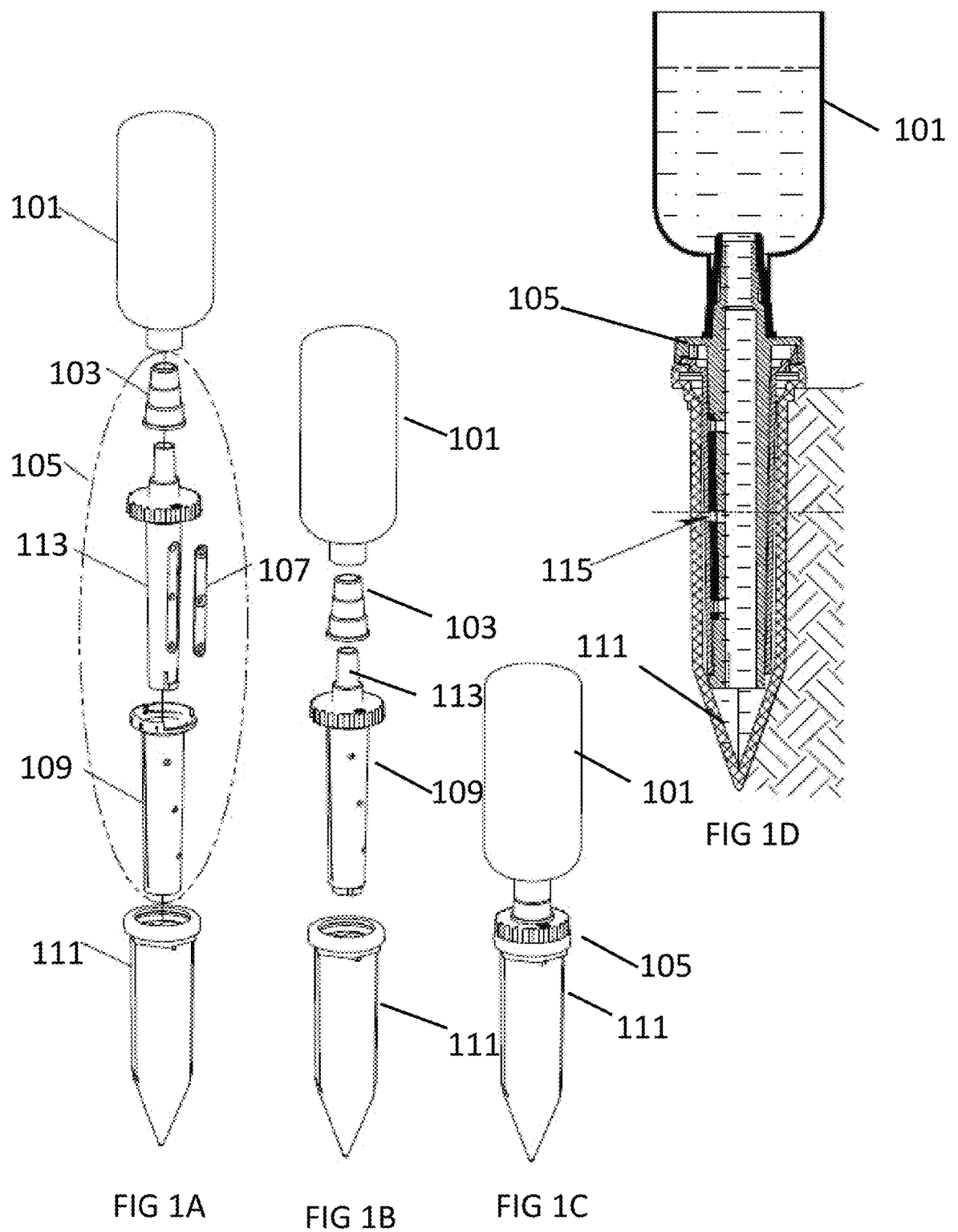
FIG. 1A-C are a series of exploded views of a plant watering device that incorporates a water level adjuster, water reservoir, and water dispenser.

FIG. 1A-C depict a plant watering device that incorporates a water level adjuster 105. FIG. 1A, is an exploded view of a plant watering device fitted with a water level adjuster 105. A water reservoir 101 is fixedly attached to the water level adjuster apparatus 105, in this embodiment, using a reservoir adapter 103 made of gasket material (ex. Silicon rubber). In other embodiments, the connection is press fit with no reservoir adapter 103. Other types of connections can be used such as a threaded fitting or glue, but the connection needs to be substantially water tight. The water level adjuster 105 in turn is supported by a water dispenser 111, in this embodiment, a plant stake. A plant stake is typically made of terracotta or other type of fluid permeable material. The connection between the water dispenser 111 and the water level adjuster 105 is not air tight and lets air move within the annular space between the water dispenser 111 and the water level adjuster 105. The water dispenser 111 is typically pressed into soil in a flower or plant pot adjacent to a plant (not shown).

FIG. 1A shows the complete plant watering assembly with all parts disassembled.

FIG. 1B shows the sleeve 109 of the water level adjuster apparatus 105 slid over the valve body 113 of the water level adjuster 105.

FIG. 1C shows the complete assembly of a plant watering device with the water level adjuster apparatus 105 inserted into the water dispenser 111 and the water reservoir 101 affixed on the water level adjuster apparatus 105.

FIG. 1D is a section view showing how the various components of FIGS. 1 A-C fit together.

A water dispenser 111, in this embodiment depicted in FIGS. 1 A-D, is a hollow, substantially cylindrical shape, open on an upper end and closed and typically necked down to a point on the lower end (to facilitate pressing into soil). The water dispenser 111 is either made completely of water permeable material or has inserts of permeable material built into an impervious structure. Permeable inserts could be made to cover perforations in an otherwise non-permeable material (for example polytetrafluoroethylene).

The water level adjuster apparatus 105 comprises a hollow, substantially cylindrical valve body 113 which fits concentrically under a sleeve 109. A perforation in the sleeve lines up with a perforation in the valve body to allow water to pass from the reservoir 101 into the water dispenser 111. If no perforations align, then the water level will be slightly above the base of the water lever adjuster assembly 105. The level of the water 115 in the interior of the water dispenser 111 is a function of what perforations line up between the sleeve 109 and the valve body 113. In the embodiment shown, there is a seal 107 between the sleeve 109 and valve body 113 which prohibits water or air from moving through any perforations that are not aligned between the sleeve 109 and valve body 113. In other embodiments the sleeve 109 is pressed against the valve body 113 forming a fluid tight seal and no gasket 107 is necessary.

To use the plant watering device with a water level adjuster 105, the sleeve 109 of the water level adjuster 105 is configured so one perforation on the sleeve 109 is aligned with a perforation on the valve body 113 to allow water flow at a desired depth. The water level adjuster 105 is placed into a water reservoir 101 that is filled with water or water and plant nutrients; the combined water reservoir 101/water level adjuster 105 is inverted and seated on the water dispenser 111 and the combined assembly is either inserted into soil (not shown), or the combined assembly of 105 and 101 are set into the interior of the water dispenser 111 that has already been set into the soil.

Figure 2:
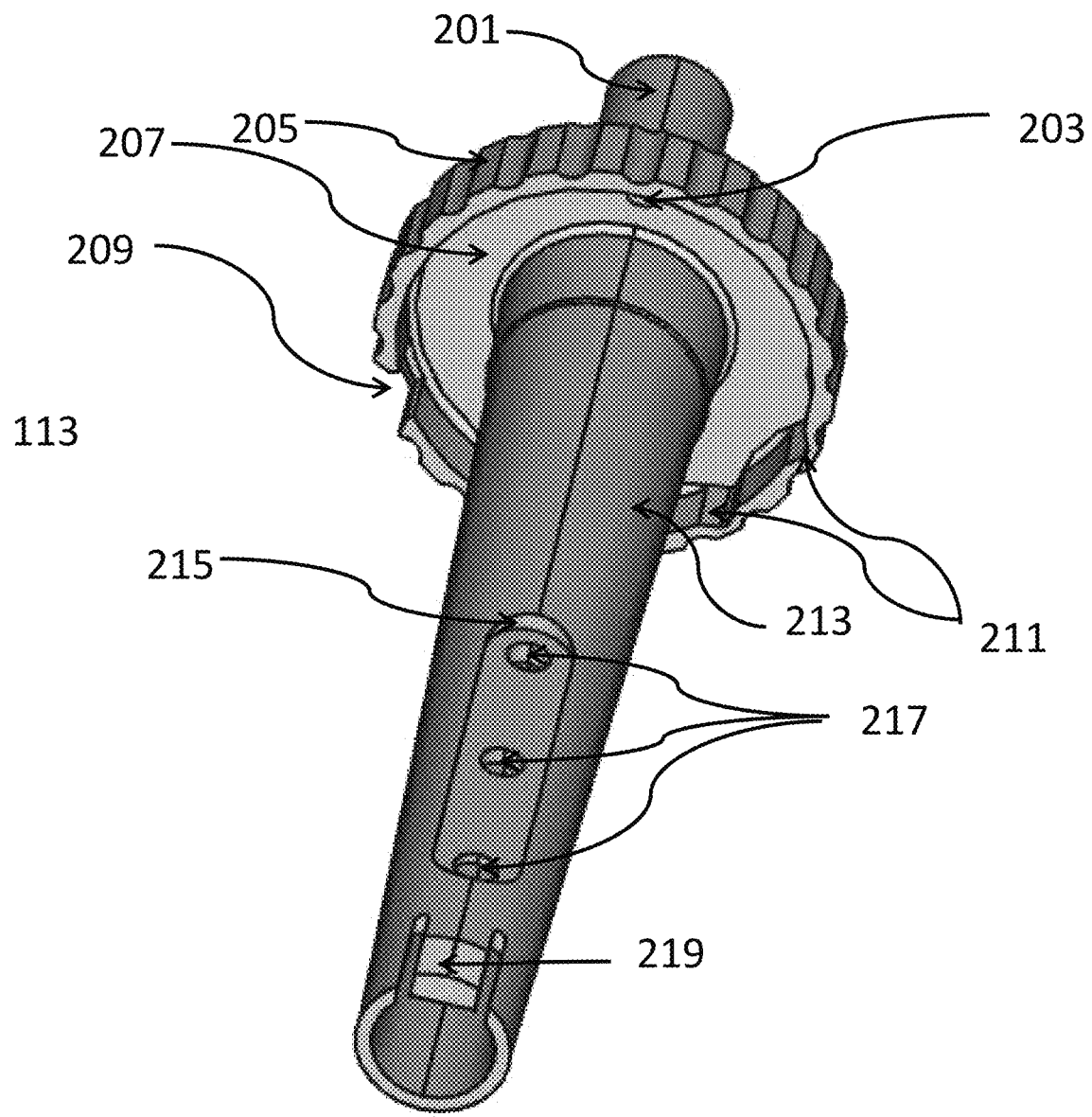
FIG. 2 is a prospective view of a valve body of a water level adjuster.

In a partial embodiment shown in FIG. 2, a valve body 113 is configured with one or more perforations 217 in a wall of the valve body 113 at intervals along an axis of the valve body 113. A flange 207 affixed to the top end of the valve body 113 is configured to rest atop a water dispenser 111 as shown in FIG. 1. The flange 207 has a rim 205 which keeps the valve body 113 centered on the water dispenser 111. At the top end of the valve body 113, a nipple 201 is attached, in this embodiment, to affix a gasket (not shown) which provides a seal between the water reservoir 101 and the valve body 113. A protrusion 203 is optionally built into the flange 207 and is designed to mesh with a slot on the sleeve 109 (see FIG. 3) to limit the rotation of the sleeve 109 around the valve body 113.

Figure 3:
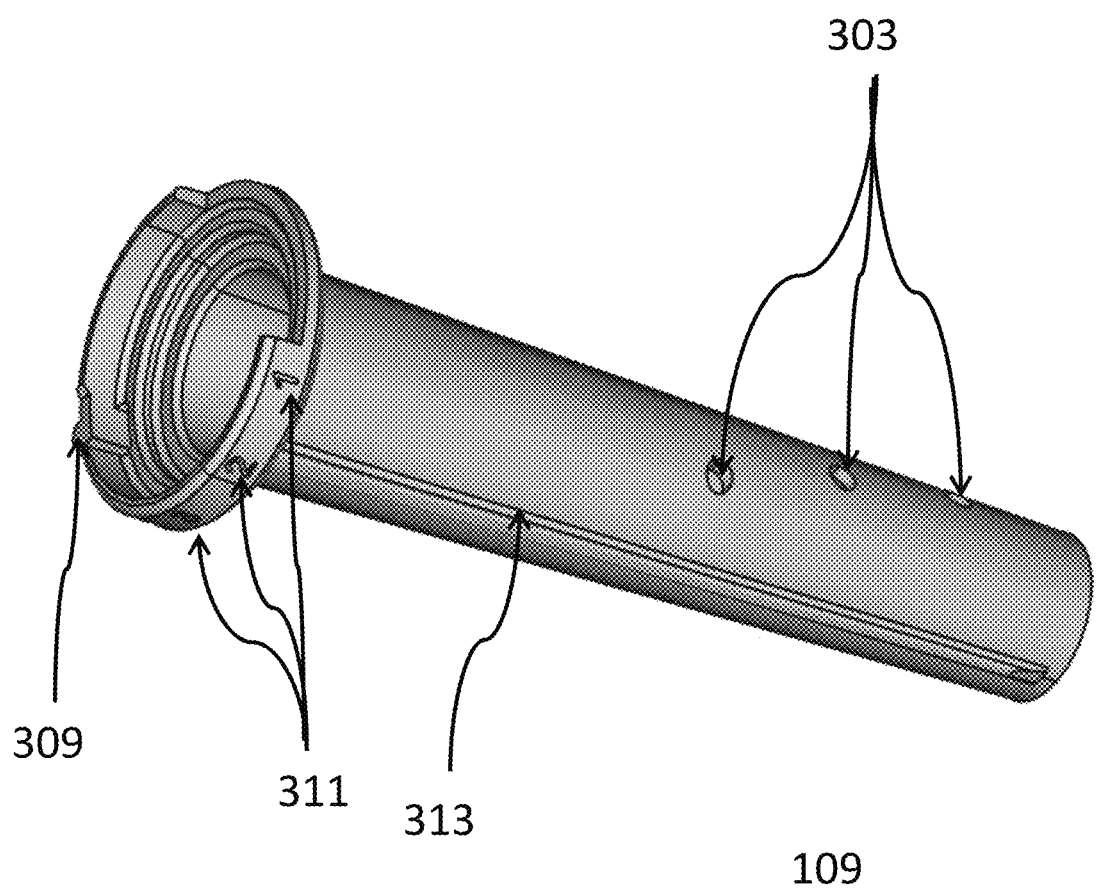
FIG. 3 is an embodiment of a sleeve of a fluid level adjuster.

The valve body 113 optionally has index notches 211 that are configured to mesh with a protrusion 309 on the sleeve 109 (see FIG. 3). An index notch 211 when meshed with the protrusion 309 will align a perforation 217 on the valve body 113 with a perforation 303 on the sleeve 109 (see FIG. 3).

The protrusion 203 on the valve body 113 functions as a stop to limit the rotational range of the valve body 113 within the sleeve 109 to the range of settings where perforations 217 in the valve body 113 can align with perforations 303 in the sleeve 109.

A viewing window 209 is designed into the rim 205 of the flange 207 and is configured to align with indicators 311 of water depth that are pad printed, debossed, or embossed on the sleeve (see FIG. 3) allowing one indicator setting 311 to be seen.

An indentation 215 is located on the valve body 113 surrounding the perforations 217 which is designed to fixedly hold a gasket 107 (see FIG. 4) in place between the valve body 113 and the sleeve 109.

A tab 219 at the base of the valve body 113 is designed of elastic material which springs out of place when the sleeve 109 is placed over the valve body 113, then spring back into place, retaining the sleeve 109 concentrically around the valve body 113.

The substantially cylindrical portion 213 of the valve body 113 can also be a truncated cone shape in some embodiments with the smaller diameter of the truncated cone at the base.

A detail of a sleeve 109 is shown in FIG. 3. The sleeve 109 is configured to be positioned concentrically within a valve body 113 (as shown in FIG. 2) and configured with the same amount of perforations 303 as the perforations 217 in the valve body 113. The perforations 303 are spaced along a helical path such that when the sleeve 109 is rotated, one perforation 303 can line up with a perforation 217 on the valve body 113.

In other embodiments the perforations on the sleeve follow a straight path along the axis of the sleeve and the perforations on the valve body follow a helical path (not shown).

For embodiments with a gasket 107 between the valve body 113 and the sleeve 109, two or more ridges 313 run along the length of the sleeve 109 in order to center the sleeve 109 on the valve body 113 and to reduce friction. Tolerances between the inner diameter of the sleeve 109 and the outer diameter of the valve body 113 vary depending on the type of material used and the thickness of a gasket 107 (if any) over the perforations 217. If no gasket 107 is used, then the tolerances have to be close enough for a seal to occur.

Figure 4:
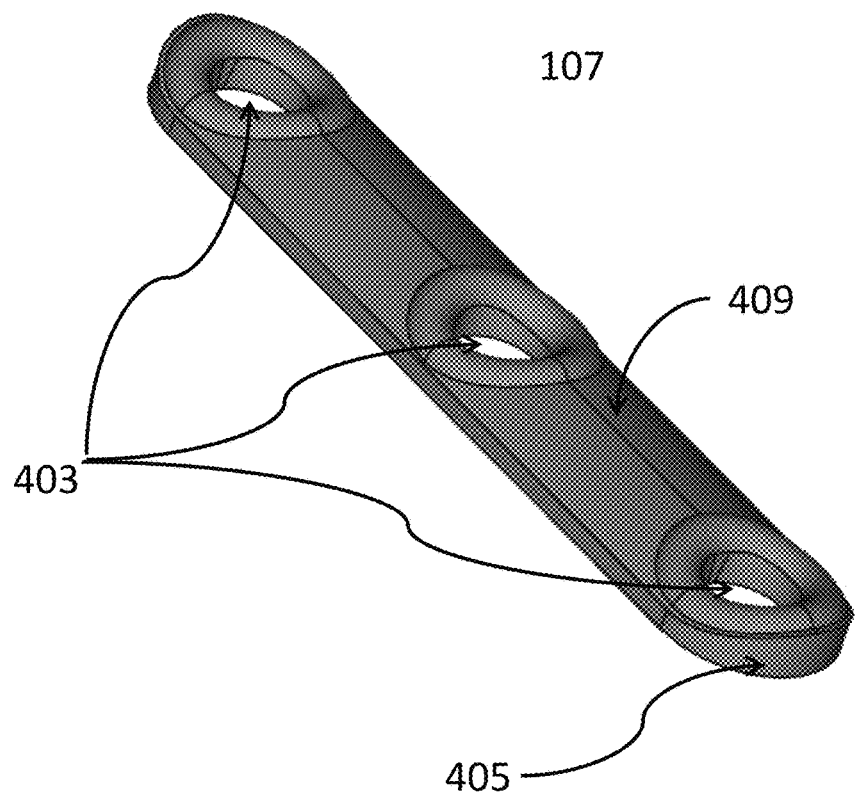
FIG. 4 is a gasket which seals the space between the valve body and the sleeve.

FIG. 4 shows an embodiment of a gasket 107 that is used between the valve body 113 and the sleeve 109. In this embodiment, the gasket 107 is a single piece of elastic material (for example silicon). The gasket 107 is fixedly attached to the valve body 113 by pressing it into the indentation 215 of the valve body 113. The perforations 403 in the gasket 107 align and are of substantially the same diameter as the perforations in the valve body 113. The upper surface 409 of the gasket 107 is curved of substantially the same radius as the valve body 113. The thickness 405 of the gasket 107 varies so that it is flush with the outer surface of the valve body 113. The area around the perforations 403 in the gasket 401 are raised and are designed with a radius such that when compressed they form an airtight seal with the sleeve 109.

In other embodiments, a separate gasket piece can be used around each perforation. The one or more gaskets could also be affixed to the sleeve rather than the valve body. The one or more gaskets could be held in place with glue. Alternatively, the perforations 217 in the valve body 113 can individually be occluded with flexible plugs (not shown) made of polyurethane, or silicone rubber, or substantially similar material obviating the necessity of the sleeve 109 by directly limiting fluid passage to a remaining port that is not occluded.

Figure 5:
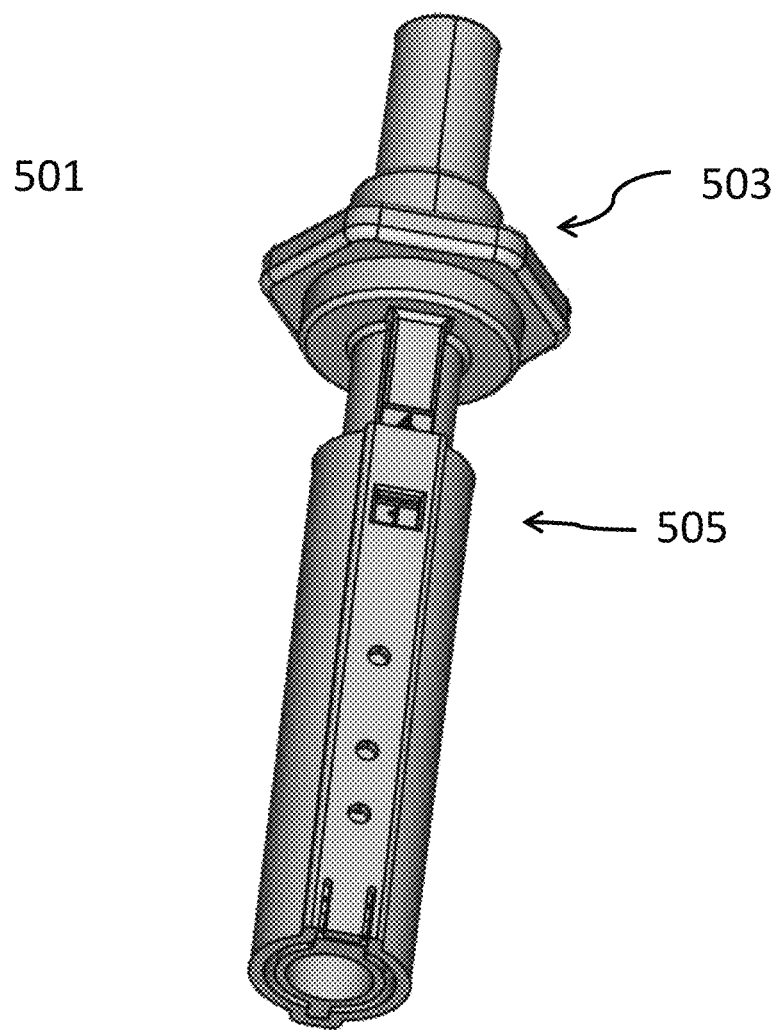
FIG. 5 is an alternate embodiment of a water level adjuster.
Figure 6:
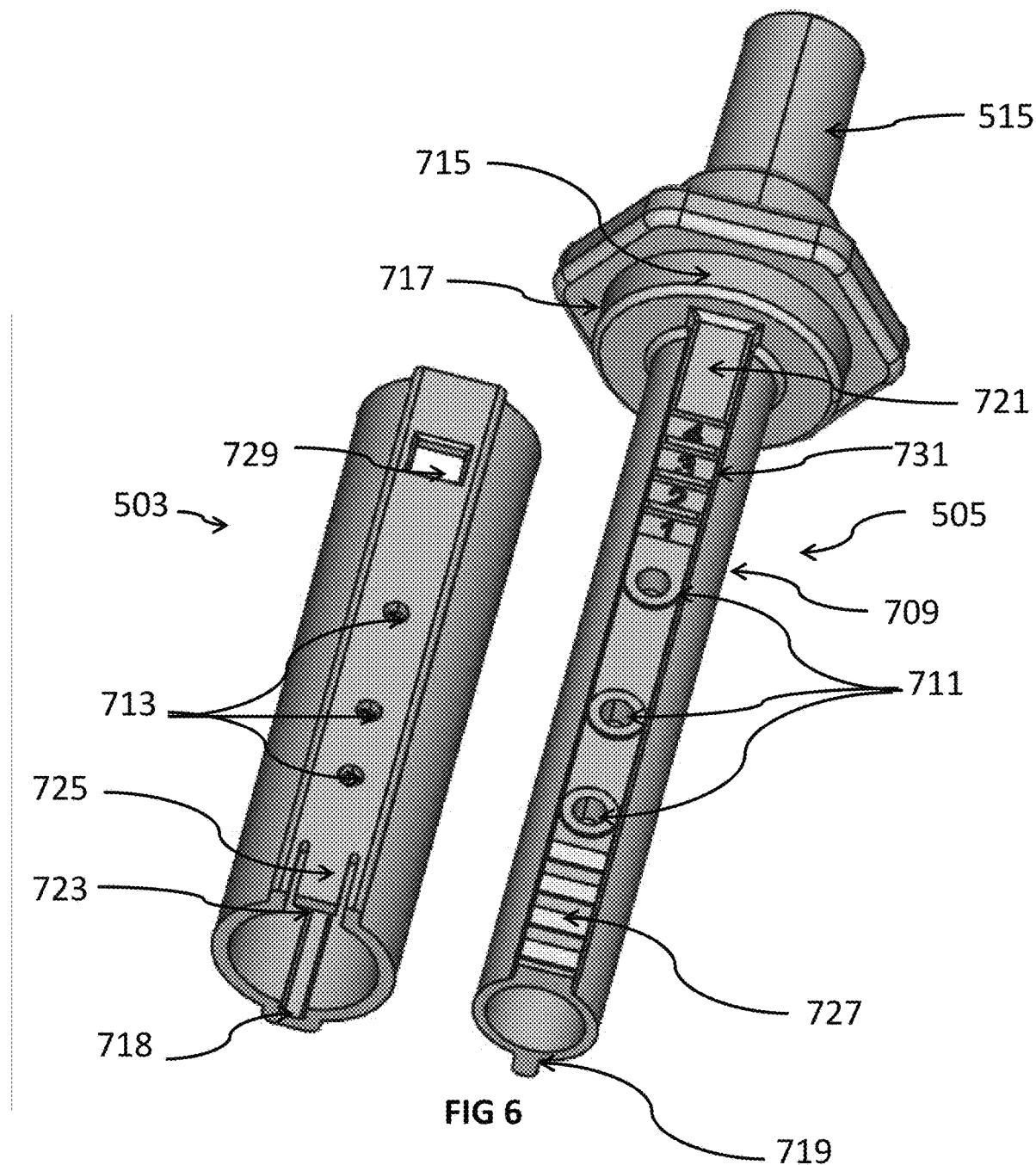
FIG. 6 is a view of the water level adjuster of FIG. 5 disassembled.

FIGS. 5 & 6 depict an embodiment of a water level adjuster 501 for a plant watering device. FIG. 5 shows an assembled water level adjuster 501 comprising a valve body 503 and a sleeve 505. In this embodiment, the sleeve 505 is configured to move up and down over the valve body 503 rather than being rotatable as in the previous embodiment depicted in FIGS. 1-4.

FIG. 6 shows the embodiment of FIG. 5 disassembled. A longitudinally bored valve body 505 includes, on a top end, a water reservoir connector portion 515. Also on the top end is a water dispenser connector, which in this embodiment comprises a flange 717 designed to support the combined water level adjuster 501 (FIG. 5) and water reservoir (not shown) seated on a rim of the fluid dispenser (not shown). Below the flange 717 is a centering disk 715 which seats within the opening on the top of the water dispenser (not shown). Below the centering disk 715 is an elongate portion 709 with one or more perforations 711 spaced longitudinally between the top end and the bottom end of the elongate portion 709. A sleeve 503 is configured with one or more perforations 713 spaced longitudinally. Note that the sleeve 503 may have fewer perforations than the valve body 505 provided that when the sleeve 503 is moved up and down relative to the valve body 505, at least one perforation lines up between the two components selectively at each location along the line of perforations in the valve body 505.

The elongate portion 709 of the valve body 505 and the sleeve 503 both have a uniform cross section for their entire lengths with the inside radius of the sleeve 503 being of a slightly greater radius than elongate portion 709 of the valve body 505.

In the embodiment of FIGS. 5 & 6 the sleeve 503 is fitted with a first groove 718 and the valve body 505 is fitted with a first ridge 719 that fits into the first groove 718. Opposite the first ridge 719, is a second ridge 721 that contains the one or more perforations 711. There is a flat surface at least around the circumference of the perforations 711, the flat surface being tangential to the circumference of the valve body 505. There is a second groove 723 in the sleeve 503 opposite the first groove 718 with a flat surface that fits within the second ridge 721 forming a fluid tight seal between the perforations 711 and the flat surface of the second groove 723, but still allowing the sleeve 503 to slide relative to the valve body 505. Note that the seal could be augmented with a gasket or O-rings or grease between the sleeve 503 and the valve body 505.

A depth indicator comprising a window 729 and depth indicator markings 731 can also be incorporated into the design.

The position of the sleeve 503 is held in place by an arrangement of a scalloped ridges 727 located on the valve body 505. When the sleeve 503 is moved relative to the valve body 505, the protrusion 725 can move past the high point of a scallop 727 by elastic deformation. To assist in this deformation, the protrusion 725 may be made of soft plastic or other elastic deformable material or may have stress relief channels cut axially such that the protrusion 725 acts like a spring. The protrusion 725 can be circular, oval or v-shaped in section of substantially the same diameter as a scallop 727 which has a similar section such that when engaged, the two surfaces tend to remain rigidly in place. Scallops 727 and protrusions 725 can be reversed where protrusions are on the valve body 505 and scallops are on the sleeve 503.

FIGS. 7 A-D show partial embodiments depicting only the valve body and sleeve portion of a water level adjuster (the attachment points for a water reservoir and water delivery system are not shown). In these embodiments a cylindrical sleeve 802 (FIGS. 7A & 7C) is designed to fit concentrically over a cylindrical valve body 800 (FIGS. 7B & 7D). The cylindrical sleeve 802 (FIG. 7A) comprises a cylinder of radius r having perforations 804 that are placed along a helical path 808 where perforations do not extend more than one rotation of the helix 808 and the longitudinal length of the helix d is less than the length of the sleeve 802. FIG. 7B depicts a cylindrical valve body 800 that contains a slot 810 along a longitudinal axis of the cylinder and has a length d which is equal to or greater than the longitudinal length of the helix 808. Inner radius $r_2$ of the valve body 800 is substantially the same as the outer radius r of the sleeve 802. Sleeves are constructed of an elastic material, for example polyethylene plastic, which allows the outer wall of the valve body 800 to contact the inner wall of the sleeve 802 while allowing the sleeve 802 to rotate with respect to the valve body 800 and maintain a substantially fluid-tight seal.

Figure 7A:
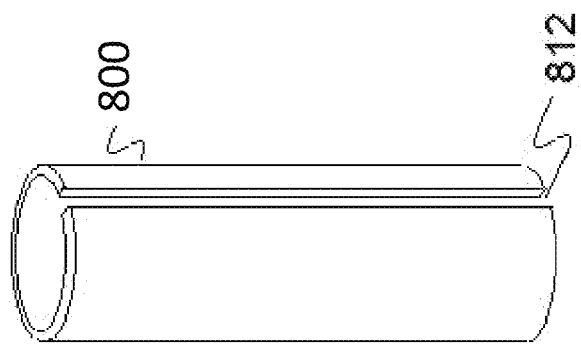
FIG. 7 A-D shows alternate embodiments of a valve body sleeve arrangement of a water level adjuster.
Figure 7B:
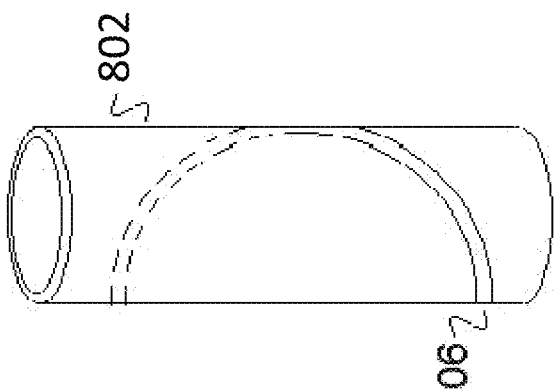
Figure 7C:
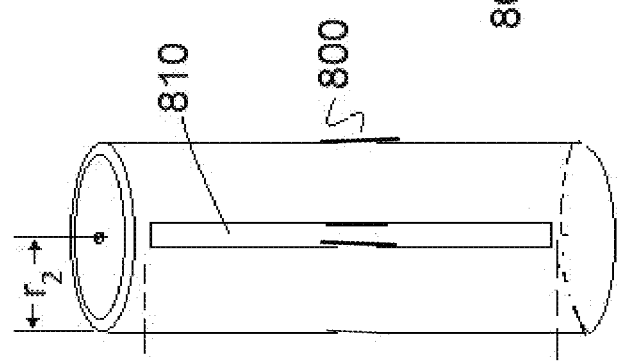
Figure 7D:
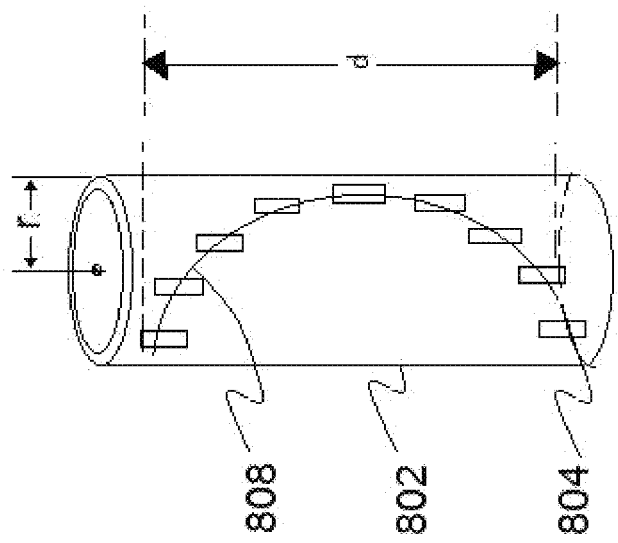

FIG. 7D shows an embodiment of the valve body 800 which has a slot 812 extending the entire length of the valve body 800. This slot 812 both serves as the water source for alignment with perforations of the sleeve 802 and also provide elasticity to allow the sleeve 802 to slide over the valve body 800.

FIG. 7C is an alternate embodiment of the sleeve 802 where the perforations comprise a single helical slot 806. This may be easier to manufacturer and provides infinite adjustability.

The vertical slot 810 or 812 could also be a series of perforations (not shown).

In other embodiments, the helically aligned perforations and the vertically aligned perforations can be reversed one on the sleeve and one on the valve body.

Figure 8:
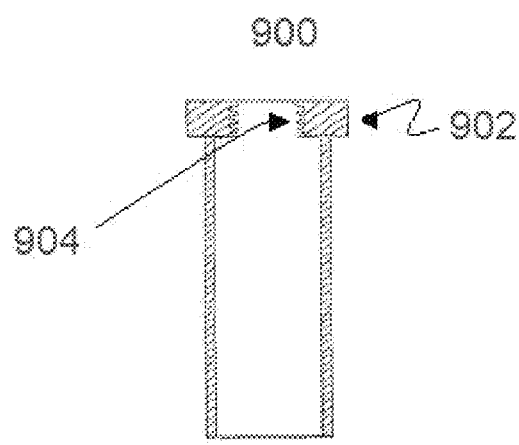
FIG. 8 is a partial embodiment of a valve body configured with a threaded connector for a water reservoir.

FIG. 8 is a section view of an embodiment of a sleeve 900 which shows a flange 902 to support the water level adjuster (not shown) on an open container and also a threaded portion 904 to attach to a threaded water reservoir (not shown).

Figure 9:
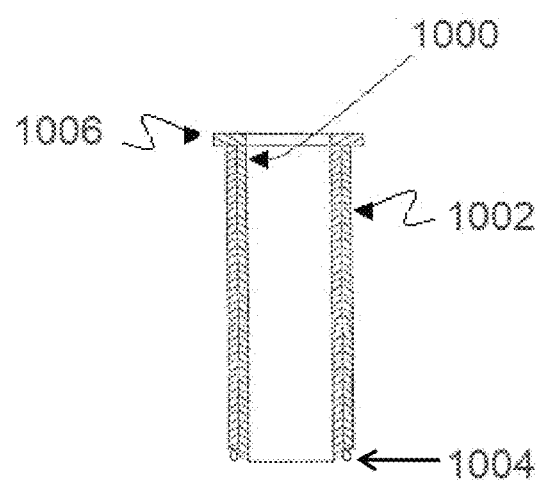
FIG. 9 is a partial embodiment of a cylindrical rotatable sleeve over a valve body held in place by a retaining clip.

FIG. 9 depicts a section view of an embodiment of a valve body 1000 with a flange 1006 that is used to contain the sleeve 1002 in place. In addition, a retaining clip (or O-ring) 1004 is fitted to valve body 1000 which is notched to hold the retaining clip and which functions to keep the sleeve 1002 from slipping. Notice in this configuration that the valve body extends above and below the sleeve. The retaining clip 1004 and flange 1006 may be used together or separately in embodiments.

Figure 10:
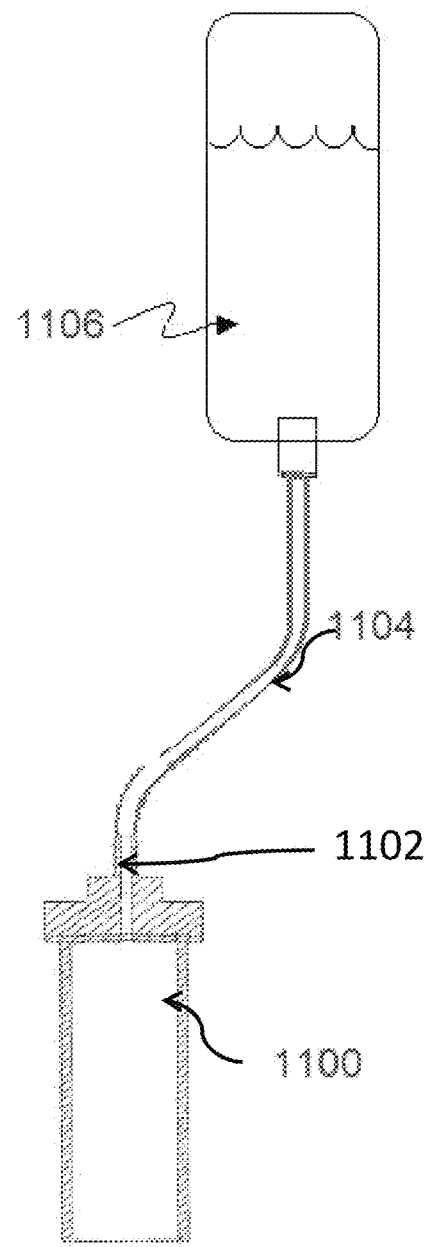
FIG. 10 depicts a water level adjuster with a remote water reservoir.

FIG. 10 is a partial embodiment of a valve body 1100 equipped with a nipple 1102 configured to have a hose 1104 press fit onto it. The hose 1104 in turn is connected to a water reservoir 1106 which when in place above the water level adjuster is capable of feeding water by gravity flow to a plant watering device.

Figure 11:
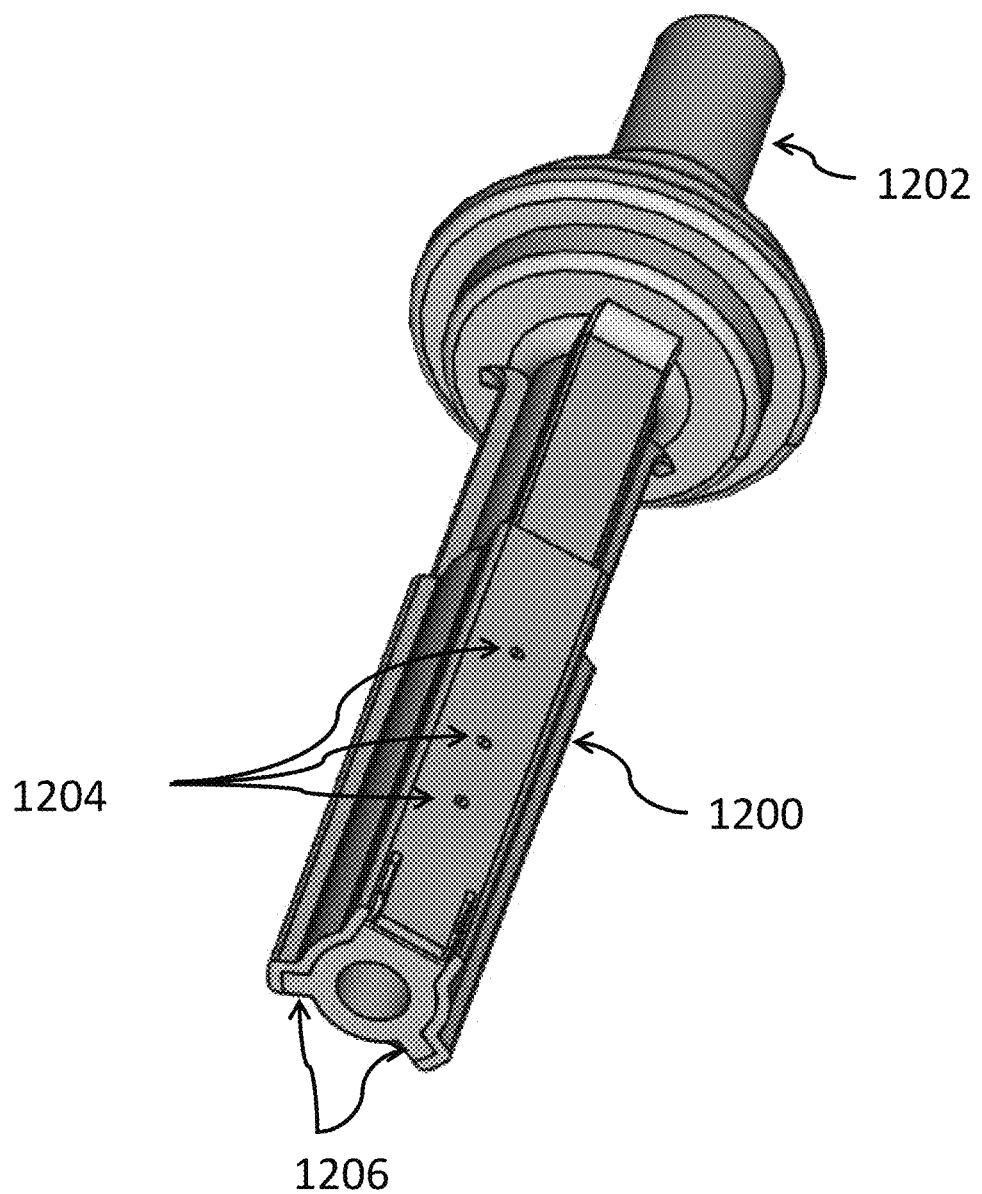
FIG. 11 is an embodiment of a water level adjuster with a sliding sleeve that only partially covers the circumference of the valve body.

FIG. 11 depicts an embodiment with a sleeve 1200 that slides relative to a valve body 1202. Notice that the sleeve 1200 does not cover the total circumference of the valve body 1202 and the sleeve is supported by two ridges 1206 that are located at angles to the perforations 1204 rather than opposite the perforations 1204.

Please note that the above embodiments are examples of how the water level adjuster for a plant watering device can operate. Features that are pointed out in one embodiment that are not described in other examples may well be incorporated in the other embodiments. All embodiments have in common at least one perforation in a valve body and at least one perforation in a sleeve with a fluid tight seal between them.

It has generally been found under normal conditions that perforations in both the sleeve and the valve body must have a diameter of at least 3 mm to allow unimpeded flow of air or water. If a gasket is used for seal, in some embodiments, it must incorporate a compressive force sufficient to form an effective seal in day to day usage.

The invention claimed is:

1. An apparatus for adjusting a water level in a plant watering device comprising:
   a hollow, substantially cylindrical valve body having a top end and a bottom end and configured with:
      perforations in a wall of the valve body, the perforations falling along a vertical path between the top end and the bottom end of the valve body,
      the top end of the valve body configured with:
         a fluid reservoir connector, and
         a flange configured to rigidly support the valve body within a fluid dispenser and;
   an outer sleeve positioned concentrically outside the valve body and configured with a same number of perforations as the valve body, the perforations in the outer sleeve spaced along a helical path wherein each perforation on the sleeve has the same relative vertical spacing as the perforations on the valve body relative to the top end and bottom end of the valve body;
   whereby the sleeve is moveable by rotation about the valve body such that only one perforation in the valve body lines up with one perforation in the sleeve at a specific angle of rotation allowing fluid to flow through the set of aligned perforations; and
   a compressible gasket that is fixedly attached to the valve body and which surrounds each perforation in the valve body and is in elastic watertight contact with the sleeve.

2. The apparatus of claim 1 wherein the substantially cylindrical valve body and sleeve are truncated cones with the smaller diameter of the truncated cone on a bottom end of the valve body and sleeve.

3. The apparatus of claim 1 wherein the valve body is longer than the outer sleeve and has a groove near the bottom end of the valve body with a retaining ring installed below a bottom end of the outer sleeve.

4. The apparatus of claim 1 wherein near the top end of the sleeve, there is a viewport built into the sleeve which aligns with one of multiple water depth indicators that are etched or painted on the valve body when one perforation on the valve body aligns with one perforation on the sleeve.

5. The apparatus of claim 1 further comprising an elastic tab built into a bottom end of the sleeve which clicks into a receiver indentation built into the bottom end of the valve body when the sleeve is placed over the valve body, holding the sleeve in place and aligning one perforation on the valve body with one perforation on the sleeve.

6. The apparatus of claim 1 further comprising an elastic tab built into the sleeve which aligns with indentations built in the valve body when one perforation on the valve body aligns with one perforation on the sleeve.

\* \* \* \* \*